Oct. 9, 1962 C. B. INGRAM ETAL 3,057,559
COUPLING CARRIAGE FOR ARTICULATED MOBILE SPRINKLER LINES
Filed Oct. 26, 1959 3 Sheets-Sheet 1
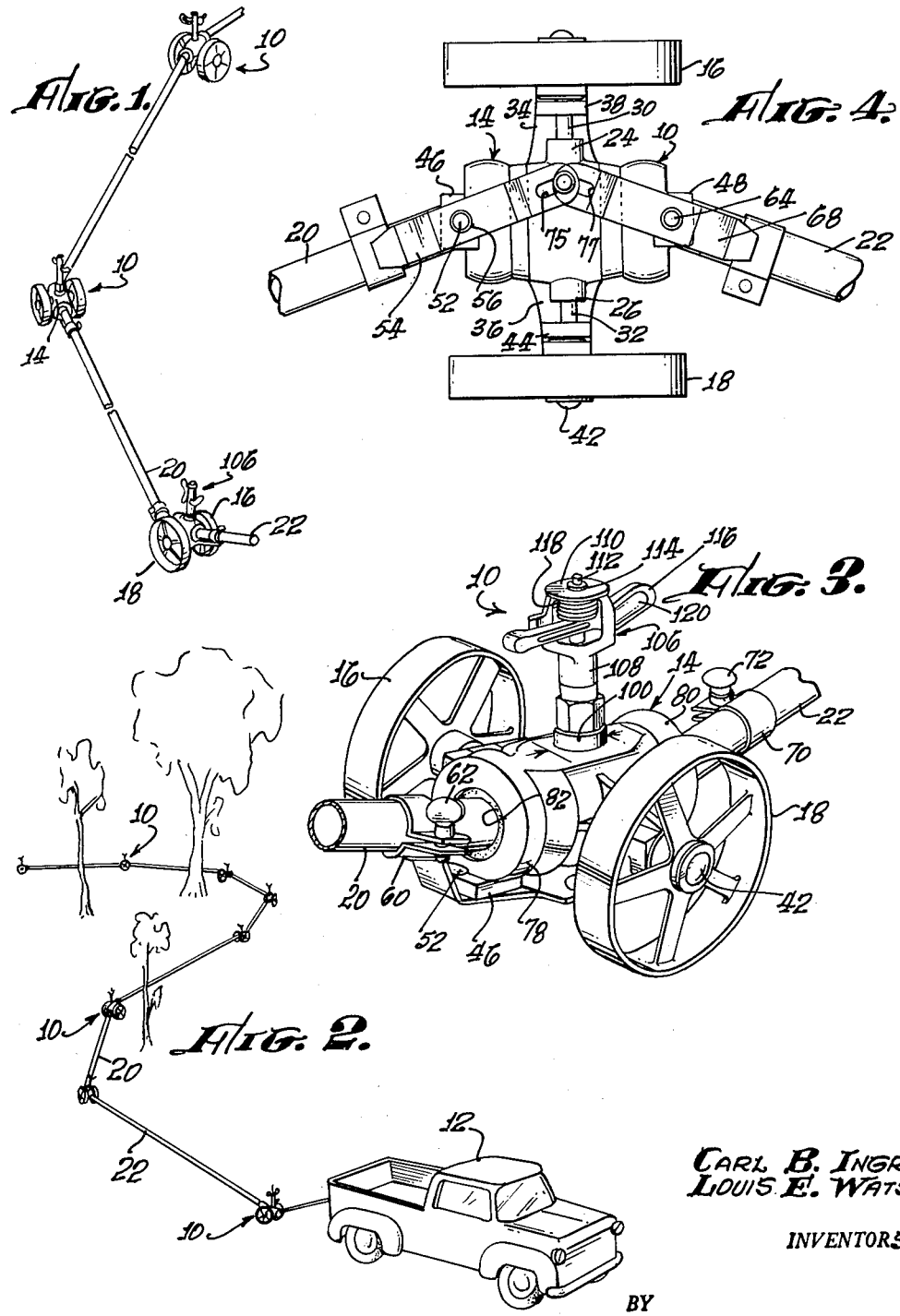
CARL B. INGRAM,
LOUIS E. WATSON,
INVENTORS.
BY
Boniard D. Brown
ATTORNEY.

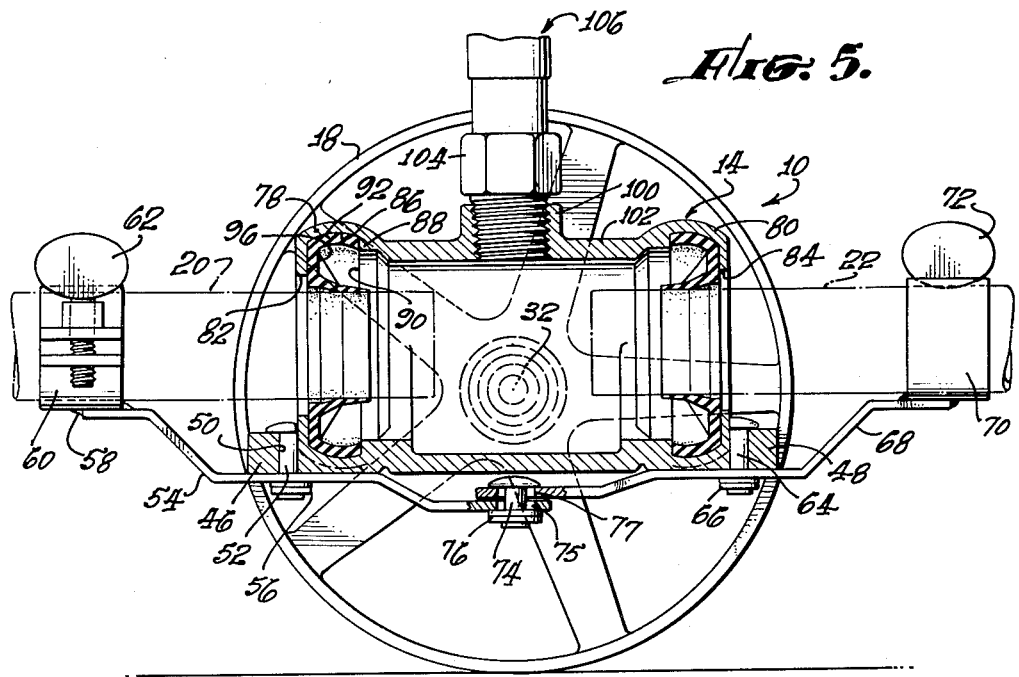
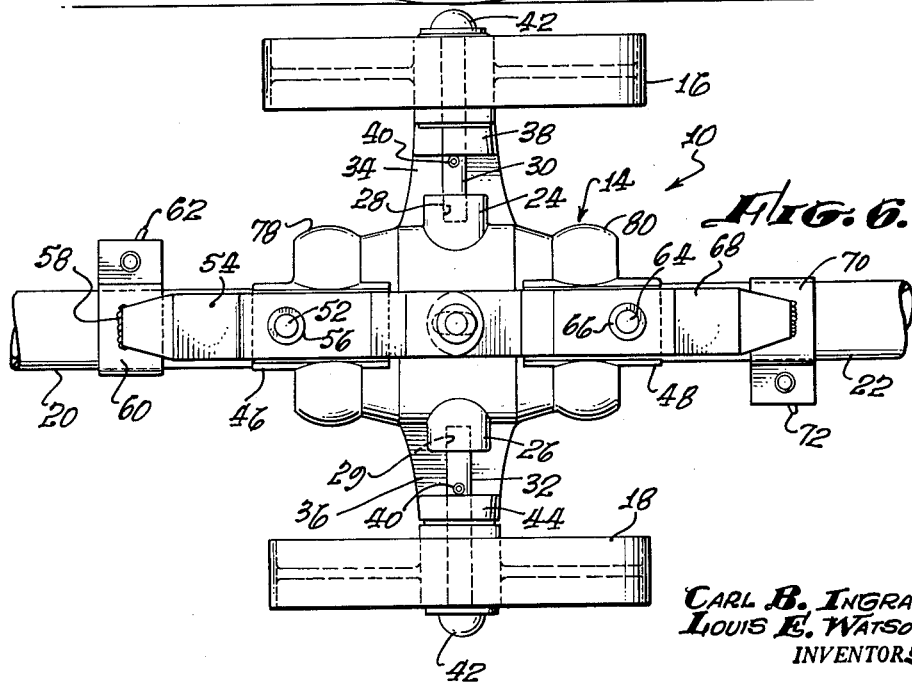
CARL B. INGRAM,
LOUIS E. WATSON,
INVENTORS.

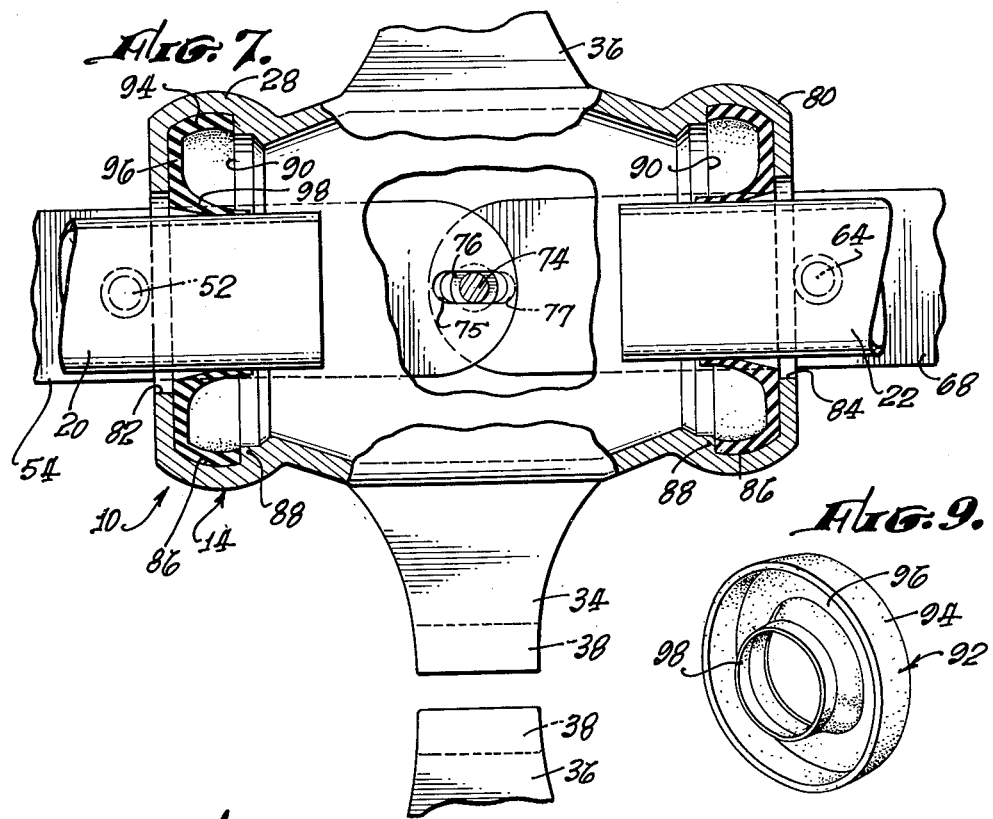
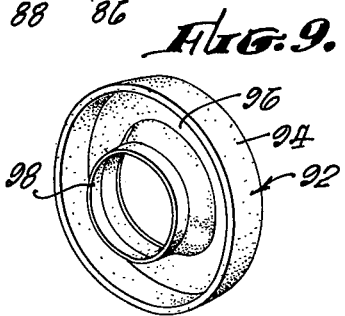
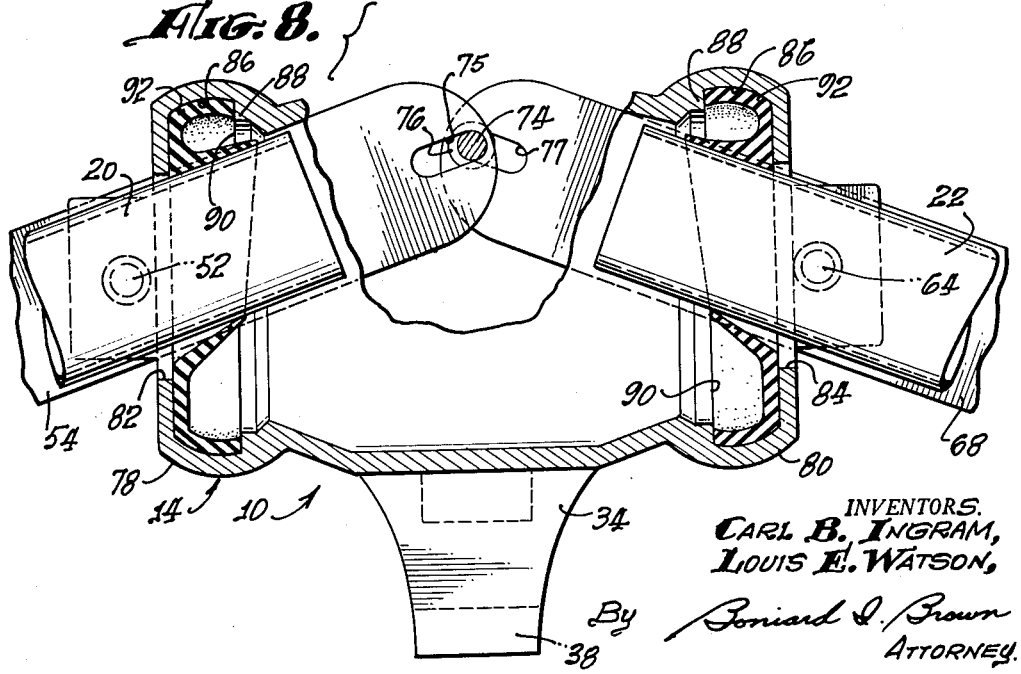

United States Patent Office 3,057,559
Patented Oct. 9, 1962

3,057,559
COUPLING CARRIAGE FOR ARTICULATED
MOBILE SPRINKLER LINES
Carl B. Ingram, 12366 Elliott Ave., El Monte, Calif., and
Louis E. Watson, 636 Briarcroft Road, Claremont,
Calif.
Filed Oct. 26, 1959, Ser. No. 848,803
3 Claims. (Cl. 239—213)

The present invention relates generally to improvements in mobile sprinkling equipment; more particularly, it relates to coupling carriages for articulated mobile sprinkler lines wherein a plurality of articulated pipe sections are adapted to follow substantially in the path of a pipe section being towed.

This general type of equipment has been known in the prior art, and an articulated sprinkler line apparatus is shown and described in United States Patent No. 2,879,787, issued on March 31, 1959, to Carl B. Ingram for a Wheeled Pipe Line Carrier. In such an apparatus, a plurality or string of articulated pipe sections carried by a plurality of carriages are adapted to be towed manually or by a vehicle, in order to facilitate movement to different areas to be sprinkled. The apparatus is adapted for sprinkling relatively large lawn or grass covered areas such as parks, golf courses, cemeteries, orchards or vineyards. Carriages or wheels are generally provided substantially at the ends of adjacent pipe sections, and it is important that each of the wheel means or carriages follow in substantially the same path as the carriage means or wheels which precede it, in order that obstacles may be avoided and the sprinkler line may be disposed for sprinkling irregularly-shaped areas.

Couplings and carriages of the prior art have been characterized by certain disadvantages and shortcomings. Many have been relatively complex and expensive. Only one pivotal connection has generally been provided between adjacent pipe sections, and it has therefore generally been required that a flexible connection between pipe sections be provided or that such expedients as ball-and-socket joints be provided. A unitary coupling carriage body could not be utilized. With such constructions, a sprinkler head cannot be effectively mounted at or directly over a coupling. A coupling must generally be mounted at an undesirably high elevation, resulting in a tendency to tip over on relatively sharp turns.

The present invention provides a coupling carriage preferably in the form of a unitary rigid body member having a linkage and pivotal connection at each end for accommodating adjoining pipe sections. The body member may be essentially a single unitary fitting having a sprinkler head thereon. The structure makes possible the positioning of the carriages and pipe sections relatively close to the ground, resulting in more efficient and effective mobility. No flexible coupling is required between interconnected pipe sections. A seal of unique configuration is accommodated by the body member in a manner which permits relatively wide angular movement of pipe sections relative to the body member while maintaining a fluid-tight seal between the body member and the pipe sections. A novel linkage arrangement, involving two pivot points, results in the angle between adjacent pipe sections being at all times bisected by the axis of the carriage wheels, thereby insuring that successive coupling carriages will follow in substantially the same path as the leading coupling carriage and the towing means, such as a vehicle. The articulated sprinkler line is therefore adapted to be towed in either direction. The invention provides a rugged, durable coupling carriage of simplified and relatively inexpensive construction.

It is an object of the present invention to provide a coupling carriage for articulated sprinkler lines wherein novel linkage means cause the angle between adjacent pipe sections to be continuously bisected by the carriage wheel axis to cause successive coupling carriages to follow in substantially the same path as a leading coupling carriage.

An object of this invention is the provision of a coupling carriage for an articulated mobile sprinkler line wherein a novel linkage arrangement controls wheel movement to cause successive coupling carriages to follow substantially the same path when the sprinkler line is towed from either end.

It is an object of this invention to provide a coupling carriage for articulated sprinkler lines wherein novel seal means are provided which permit wide angular movement of interconnected pipe sections while maintaining fluid sealing between the pipe sections and the coupling carriage.

An object of the present invention is the provision of a coupling carriage utilizing a linkage arrangement involving two pivot points, thereby permitting the use of a rigid unitary coupling body member.

It is an object of this invention to provide a coupling carriage of rugged, simplified, durable and relatively inexpensive construction.

It is an object of the present invention to provide a coupling carriage construction adapted to be positioned at a relatively low elevation above the ground.

Other objects, features and advantages of the present invention will become apparent to those versed in the art from an examination of the following description, the appended claims and the accompanying drawings, wherein:

FIGURE 1 is a perspective view of a plurality of coupling carriages according to the present invention interconnecting pipe sections in operative relation to form an articulated mobile sprinkler line;

FIGURE 2 is a perspective view of an articulated mobile sprinkler line, like that shown in FIGURE 1, being towed by a vehicle in an irregular path about obstacles;

FIGURE 3 is a perspective view of a preferred embodiment of the wheeled coupling carriage of the present invention;

FIGURE 4 is a bottom view of the coupling carriage of FIGURE 3;

FIGURE 5 is an elevational sectional view of the coupling carriage of FIGURE 3;

FIGURE 6 is a bottom view of the coupling carriage of FIGURE 3, shsowing the linkage and pipe sections in aligned relation;

FIGURE 7 is a fragmentary bottom view of the coupling carriage of FIGURE 3, showing details of the seal and linkage arrangement according to the present invention;

FIGURE 8 is a fragmentary view, similar to that of FIGURE 7, showing the linkage elements and pipe sections of FIGURE 7 in angular relation; and FIGURE 9 is a perspective view of the fluid seal utilized with the present invention.

Referring to the drawings, and particularly to FIGURES 1 and 2, a plurality of coupling carriages 10 according to the present invention are shown interconnecting a plurality of pipe sections to form an articulated mobile sprinkler line. As indicated in FIGURE 2, the sprinkler line is towable, as by a vehicle 12, in an irregular path, with the coupling carriages following each other in substantially the same path.

The wheeled coupling carriage 10 of the invention is shown in detail in FIGURES 3, 4, 5 and 6. The coupling assembly 10 includes a body member 14 supported by wheels 16, 18 and interconnects pipe sections 20, 22. Rounded bosses 24, 26 extend laterally from respective lower side portions of the body member and have respective openings 28, 29 which serve as end bearings for wheel axles 30, 32. Web portions 34, 36 are formed intergrally with body member 14 and extend from respective sides thereof, as shown. A lug 38 at the outer end of web portion 34 has an opening to provide an axle bearing aligned with end bearing opening 28. As shown in FIGURE 6, axle 30 is secured by a retaining pin 40 which extends transversely through the axle, and wheel 16 is secured by a head 42 of the axle. On the opposite side of body member 14, a similar lug 44 provides a bearing aligned with end bearing 29 and a retaining pin secures the axle 32.

As illustrated in FIGURES 4 and 5, a linkage structure is provided at each end of the body member 14. Lug portions 46, 48 are formed integrally with the body member and extend axially in opposite directions from the lower end portions of the body member. An opening 50 in lug portion 46 accommodates a pivot pin 52 on which a link member 54 is pivotally mounted, the member being retained by washers 56 which are secured by an upset end portion of the pin. The outer end portion of link member is secured as by welding at 58 to a clamp bracket 60, flange portions of which are engaged by a wing nut 62 to releasably secure the clamp bracket to the pipe section 20, thereby providing for rapid and convenient assembly and disassembly. A similar linkage structure is provided at the opposite end of the body member, and includes a pivot pin 64, washers 66, a link member 68, a clamp bracket 70 and a wing nut 72.

The inner end portions of the link members 54, 68 are pivotally secured together by a pivot pin 74 which extends through appropriate openings 75, 77 in the respective end portions and which is secured by washers 76, as shown.

The construction of the body member 14 is identical at each end. As illustrated in FIGURES 5, 7 and 8, enlarged end portions 78, 80 and axial openings 82, 84 are provided. Within each end portion, an arcuate axially extending recess 86 is defined between a shoulder 88 and an end wall 90. This recess accommodates a resilient seal or gasket 92. As shown, seal 92 has an arcuate portion 94 adapted to seat in the recess 86, a transverse portion 96 which seats against end wall 90, and a tapered axially extending sleeve portion 98 which engages the pipe section 20 in sealing relationship. Sleeve portion 98 of the seal element is provided with a tapered surface confronting the pipe section, which is normally not in engagement with the pipe section, for a purpose hereinafter described.

From the foregoing description, it will be understood that pipe sections 20 and 22 are each pivotally mounted to the body member 14 by means of the linkage structure described, and are pivotally linked together. It will be observed and understood that pivotal movement of each pipe section through a relatively wide angle is accommodated by the geometrical relationships of the enlarged end portion of the body member, the recess 86, the seal and the pipe section. Fluid pressure within body member 14 acts on the sleeve portion 98 of the seal element to urge it against the pipe section to provide fluid-tight pressure sealing. This sealing is effective despite wide angular movement of the pipe sections, because of the action of the seal, as more fully described hereinafter.

Referring to FIGURES 3 and 5, a boss 100 extends upward from a flattened upper surface 102 of the body member and receives a threaded coupling 104 for mounting any appropriate type of sprinkler head such as the conventional type shown in FIGURE 3. The sprinkler head 106 includes a yoke member 108 rotatably mounted on coupling 104. A disc 110 is secured to the yoke member by engagement with a vertical shaft 112 and by a retainer 114. A rotor 116 is pivotally mounted on shaft 112 and is normally biased against one arm of the yoke member by a torsion spring 118 disposed about the shaft 112. The yoke member has a radial port (not shown) for discharging water into a recessed surface 120 defined in an arm of the rotor. Torque produced on the rotor by the water discharged from the radial port rotates the entire sprinkler (106) through a selected angle against the urging of the torsion spring. During each intermittent operation, the rotor moves into and out of the path of water being discharged through the radial port, so that discharged water strikes the rotor to cause this operation to be successively repeated, with the sprinkler head intermittently rotating through the selected angle.

In operation, a plurality of coupling carriages 10 interconnect a plurality of pipe sections 20, 22 to form an articulated mobile sprinkler line, as shown in FIGURES 1 and 2. The articulated sprinkler line may be towed from either end manually or by a vehicle, and successive coupling carriages follow in substantially the same path as the leading coupling carriage being towed.

From the foregoing description and from the geometric relationships of the parts, it will be understood that when force is exerted on a pipe section such as 20 (FIGURES 4 and 8) to cause it to pivot with respect to body member 14 about its pivot pin 52, a pivoting force is exerted on the interconnected pipe section 22 at the pivot pin 74 to cause pipe section 22 to pivot about pivot pin 64. Force is thereby exerted on the body member at pivot pin 64 to cause movement of the body member to such a position that the axis of wheels 16, 18 bisects the angle between the pipe sections. This control of the wheel axis orientation results from the construction wherein each link 54, 68 is pivotally attached to the body member and wherein there is a pivotal connection between the links. The wheel axle bisects the angle between the pipe sections at all times, thereby insuring that each successive coupling carriage follows in substantially the same path as the leading coupling carriage being towed. If the wheel axle orientation were not thus controlled, the coupling carriages would not follow the path of a lead carriage and the mobile sprinkler line could not be maneuvered through turns, about obstacles, or into an irregular configuration for sprinkling.

It is to be understood that the coupling carriage of the present invention is adapted to permit vertical pivoting of pipe sections as well as horizontal pivoting, because of the essentially universal type of connection between the pipe sections and the body member 14. Such vertical pivoting requires that the linkage components be loosely joined to permit relative vertical movement. The sprinkler line has the capability of movement uphill, downhill and through depressions in the surface of the ground.

The seal 92 is an important feature of the present invention. Its configuration and its cooperation with the body member 14 and the pipe sections permit wide angular movement of each pipe section relative to the body member while fluid sealing is maintained between the pipe sections and the coupling carriage. As shown in FIGURES 7, 8 and 9, the arcuate portion 94 and the transverse portion 96 of the seal seat against recess 86 and end wall 90 in the enlarged end portion of the body member. Sleeve portion 98 is disposed about a pipe section, and fluid pressure in the body member urges the sleeve portion against the pipe section to provide sealing. When a pipe section is angularly inclined with respect to the axis of the body member, as shown in FIGURE 8, a portion of the seal is deformed. Sufficient space is provided in the enlarged end portion 28 of the body member to accommodate the deformation. Opposite from the compressed portions of the seal, the sleeve portion 98 is maintained in sealing contact with the pipe section by the fluid pressure in the body member, as indicated in FIGURE 8. The configuration of the seal, the deformation space provided in the end portion of the body member, and the tapered portion 98 of the seal thus permit wide angular movement of a pipe section while maintaining a fluid-tight seal between the pipe section and the body member.

These skilled in the art will appreciate that the present invention achieves the objects and realizes the advantages hereinbefore mentioned. The novel linkage arrangement governs the orientation of the coupling carriage so that the wheel axis continuously bisects the angle between adjacent pipe sections, and successive coupling carriages are caused to follow in substantially the same path as a leading coupling carriage being towed. A unitary body member is utilized and two pivotal connections to this body member are provided for pipe sections connected by the coupling carriage. Coupling is achieved in a manner which permits the pipe sections to be positioned at a relatively low level with respect to the ground. The unitary body member permits the mounting of a sprinkler head thereon directly over the wheel axle. The unique seal arrangement permits wide angular movement of interconnected pipe sections while maintaining fluid sealing between pipe sections and the coupling carriages. The coupling carriage is rugged, simplified and is relatively inexpensive to manufacture.

Although a specific embodiment of the present invention has been illustrated and described herein, it will be understood that the same is merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventors claim:

1. In an articulated mobile sprinkler line, a coupling carriage for interconnecting adjacent pipe sections comprising a hollow integral body member having supporting wheels rotatable about a transverse axis, the hollow body member having integral wheel-supporting means, sealing means on the body member for receiving each of said pipe sections in pivotal fluid-tight relationship with the body member, said sealing means providing pivotal movement of each of the pipe sections relative to the body member and to the supporting wheels, means providing a pivotal connection of each of the pipe sections to the body member substantially adjacent to said sealing means, whereby relatively wide angular movement of both pipe sections relative to the body member is allowed while fluid sealing is maintained between the pipe sections and the body member, and fluid discharge means positioned at the upper central portion of the hollow body member.

2. A coupling carriage according to claim 1, wherein the means providing the pivotal connections comprises a pair of link members, each of the link members being connected to a pipe section and having a separate pivotal connection to said body member, said links being pivotally connected together, thereby maintaining the same angular relationship between the body member and the wheels and each of said pipe sections to control the orientation of the coupling carriage, whereby with the body member thus coupled in an articulated sprinkler line the coupling carriage follows substantially the same path as preceding similar coupling carriages upon being towed in either direction.

3. A coupling carriage according to claim 1, wherein the means on the body member for receiving the pipe sections in pivotal fluid-tight relationship comprises generally circular sealing members, each of said sealing members having a central inwardly extending sleeve portion engaging its respective pipe section, whereby pressure inside of the body member maintains the sleeve portion in sealing engagement with the part, each of said sleeve members having an integral peripheral inwardly extending flange portion extending into the body member in the same direction as the sleeve portion, whereby pressure within the body member exerts an outward force on said inwardly extending flange portion to maintain it in sealing engagement with the body member.

References Cited in the file of this patent

UNITED STATES PATENTS

| 2,067,424 | Wallis | Jan. 12, 1937 |
| 2,087,916 | Lanninger | June 27, 1937 |
| 2,244,396 | Kellaher | June 3, 1941 |
| 2,355,407 | Wyss | Aug. 8, 1944 |
| 2,477,592 | Gage | Aug. 2, 1949 |
| 2,652,282 | Willetts | Sept. 15, 1953 |
| 2,796,292 | Maggart | June 18, 1957 |
| 2,889,993 | Willetts | June 9, 1959 |

FOREIGN PATENTS

| 383,598 | Germany | Oct. 29, 1922 |